(12) United States Patent
Pietraski

(10) Patent No.: US 8,462,738 B2
(45) Date of Patent: Jun. 11, 2013

(54) METHOD AND APPARATUS FOR SELECTING LINK ADAPTATION PARAMETERS FOR CDMA-BASED WIRELESS COMMUNICATION SYSTEMS

(75) Inventor: Philip J. Pietraski, Huntington Station, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 13/041,999

(22) Filed: Mar. 7, 2011

(65) Prior Publication Data

US 2012/0026904 A1 Feb. 2, 2012

Related U.S. Application Data

(63) Continuation of application No. 11/740,504, filed on Apr. 26, 2007, now Pat. No. 7,903,614.

(60) Provisional application No. 60/795,300, filed on Apr. 27, 2006.

(51) Int. Cl.
*H04B 7/216* (2006.01)

(52) U.S. Cl.
USPC ............ 370/335; 370/332; 370/333; 370/466

(58) Field of Classification Search
USPC .................................. 370/335, 332, 333, 466
See application file for complete search history.

(56) References Cited

U.S. PATENT DOCUMENTS

| | | |
|---|---|---|
| 6,934,556 B2 | 8/2005 | Takano |
| 7,061,915 B2 | 6/2006 | Seidel et al. |
| 7,236,474 B2 | 6/2007 | Seo et al. |
| 7,257,423 B2 | 8/2007 | Iochi |
| 7,283,508 B2 | 10/2007 | Choi et al. |
| 7,437,166 B2 | 10/2008 | Osseiran et al. |
| 7,630,320 B2 | 12/2009 | Zhang et al. |

(Continued)

FOREIGN PATENT DOCUMENTS

| | | |
|---|---|---|
| EP | 1 524 790 | 4/2005 |
| WO | 2005/020473 | 3/2005 |

OTHER PUBLICATIONS

3GPP, "3rd Generation Partnership Project; Technical Specification Group Radio Access Network; User Equipment (UE) Radio Transmission and Reception (FDD) (Release 7)", 3GPP TS 25.101 V7.3.0, (Mar. 2006).

(Continued)

*Primary Examiner* — Kwasi Karikari

(74) *Attorney, Agent, or Firm* — Volpe and Koenig, P.C.

(57) ABSTRACT

A method and apparatus for selecting a transport format resource combination (TFRC) using an information theoretic approach are provided. The TFRC may be selected in a medium access control (MAC) layer for transmission of data in a code division multiple access (CDMA) wireless communication system. The maximum number of spreading codes available for transmission and the set of possible TFRCs may be determined based on channel characteristics. For each transport block set size (TBSS) in the set of possible TFRCs, a TFRC is selected with the largest number of spreading codes within the maximum number of spreading codes for a corresponding minimum coding rate. The corresponding code rate for each selected TFRCs is compared to a threshold to select a corresponding type of modulation. One of the selected TFRCs is selected to be provided to the physical layer that best matches the CQI and maximizes the TBSS.

15 Claims, 6 Drawing Sheets

U.S. PATENT DOCUMENTS

| | | | |
|---|---|---|---|
| 7,646,742 B2 | 1/2010 | Petrovic et al. | |
| 2001/0008542 A1* | 7/2001 | Wiebke et al. | 375/141 |
| 2003/0081692 A1* | 5/2003 | Kwan et al. | 375/295 |
| 2003/0092461 A1 | 5/2003 | Moulsley et al. | |
| 2003/0142694 A1 | 7/2003 | Takano | |
| 2003/0148780 A1 | 8/2003 | Takano | |
| 2003/0193913 A1* | 10/2003 | Murata et al. | 370/332 |
| 2004/0208160 A1 | 10/2004 | Petrovic et al. | |
| 2005/0157687 A1* | 7/2005 | Heo et al. | 370/335 |
| 2005/0208973 A1 | 9/2005 | Iochi | |
| 2006/0114935 A1 | 6/2006 | Takano | |
| 2006/0200722 A1 | 9/2006 | Braun | |
| 2006/0203933 A1 | 9/2006 | Yu | |
| 2007/0026803 A1* | 2/2007 | Malm | 455/63.1 |
| 2007/0116024 A1 | 5/2007 | Zhang et al. | |

OTHER PUBLICATIONS

3GPP, "$3^{rd}$ Generation Partnership Project; Technical Specification Group Radio Access Network; User Equipment (UE) Radio Transmission and Reception (FDD) (Release 7)", 3GPP TS 25.101 V7.7.0, (Mar. 2007).

3GPP, "$3^{rd}$ Generation Partnership Project; Technical Specification Group Radio Access Network; Physical Layer Procedures (FDD) (Release 7)", 3GPP TS 25.214 V7.4.0, (Mar. 2007).

3GPP, "$3^{rd}$ Generation Partnership Project; Technical Specification Group Radio Access Network; Physical Layer Procedures (FDD) (Release 7)", 3GPP TS 25.214 V7.0.0, (Mar. 2006).

3GPP, "$3^{rd}$ Generation Partnership Project; Technical Specification Group Radio Access Network; Physical Layer Procedures (FDD) (Release 6)", 3GPP TS 25.214 V6.11.0, (Dec. 2006).

3GPP, "$3^{rd}$ Generation Partnership Project; Technical Specification Group Radio Access Network; Physical Layer Procedures (FDD) (Release 6)", 3GPP TS 25.214 V6.8.0, (Mar. 2006).

3GPP, "Universal Mobile Telecommunications System (UMTS); Physical Layer Procedures (FDD) (3GPP TS 25.214 Version 7.4.0 Release 7)", ETSI TS 125. 214 V7.4.0, (Mar. 2007).

3GPP, "Universal Mobile Telecommunications System (UMTS); UE Radio Access Capabilities (3GPP TS 25.306 Version 7.3.0 Release 7)", ETSI TS 125 306 V7.3.0, (Mar. 2007).

* cited by examiner

METHOD AND APPARATUS FOR SELECTING LINK ADAPTATION PARAMETERS FOR CDMA-BASED WIRELESS COMMUNICATION SYSTEMS

CROSS REFERENCE TO RELATED APPLICATIONS

This application is a continuation of U.S. patent application Ser. No. 11/740,504 filed on Apr. 26, 2007, which issued as U.S. Pat. No. 7,903,614 on Mar. 8, 2011, which claims the benefit of U.S. Provisional Patent Application No. 60/795, 300 filed on Apr. 27, 2006, the contents of which are hereby incorporated by reference herein.

FIELD OF INVENTION

The present invention is related to medium access control in wireless communication systems. More particularly, the present invention is a method and apparatus for selecting link adaptation parameters in a medium access control (MAC) layer in code division multiple access (CDMA) wireless communication systems.

BACKGROUND

Wireless communication systems are well known in the art. Communications standards are developed in order to provide global connectivity for wireless systems and to achieve performance goals in terms of, for example, throughput, latency and coverage. One current standard in widespread use, called Universal Mobile Telecommunications Systems (UMTS), was developed as part of Third Generation (3G) Radio Systems, and is maintained by the Third Generation Partnership Project (3GPP).

A typical UMTS system architecture in accordance with current 3GPP specifications is depicted in FIG. 1. The UMTS network architecture includes a Core Network (CN) interconnected with a UMTS Terrestrial Radio Access Network (UTRAN) via an Iu interface. The UTRAN is configured to provide wireless telecommunication services to users through wireless transmit receive units (WTRUs), referred to as user equipments (UEs) in the 3GPP standard, via a Uu radio interface. The UTRAN may have one or more radio network controllers (RNCs) and base stations, referred to as Node Bs by 3GPP, which collectively provide for the geographic coverage for wireless communications with UEs. One or more Node Bs may be connected to each RNC via an Iub interface. RNCs within a UTRAN communicate via an Iur interface.

One type of air interface defined in the UMTS standard is wideband code division multiple access (W-CDMA). In a W-CDMA system baseband signals are spread in the frequency domain using orthogonal spreading codes prior to transmission, and despread at a receiver using the same spreading codes.

The Uu radio interface of a 3GPP system uses transport channels (TrCHs) for transfer of user data and signaling between UEs and Node Bs. Uplink refers to signaling from a UE to a Node B, and downlink transmissions are from a Node B to a UE. In 3GPP communications, TrCH data is conveyed by one or more physical channels defined by mutually exclusive physical resources, or shared physical resources in the case of shared channels. In a conventional 3GPP system, communications between a UE and a Node B are conducted using a single data stream defined by a combination of TrCHs called a coded composite TrCH (CCTrCH). Typically, a Node B is concurrently communicating with several UEs using respective CCTrCH data streams.

TrCH data is transferred in sequential groups of transport blocks (TBs) defined as transport block sets (TBSs). Each TBS is transmitted in a given transmission time interval (TTI) which may span a plurality of consecutive system time frames. The number of bits in a TBS is called the transport block set size (TBSS).

UMTS specification releases 5 and 6 pertain to high speed downlink packet access (HSDPA) and high speed uplink packet access (HSUPA), respectively. HSDPA is a downlink packet access protocol for packet based UMTS wireless communication systems employing a W-CDMA air interface with a spreading factor (SF) of 16. According to HSDPA, up to 15 spreading codes may be allocated to data for transmission in a common TTI. The data may be modulated using either quadrature phase shift keying (QPSK) modulation or 16 quadrature amplitude modulation (16-QAM). In future releases of the HSDPA standard, it is expected that additional types of higher order modulation will also be supported, such as 64 quadrature amplitude modulation (64-QAM). Fast retransmissions are accomplished according to hybrid automatic repeat request (HARQ) by retransmission combining, which enables operation at relatively high Block Error Rates (BLER).

A the CQI mapping table, as in Table 1 for example, indicates a preferred TFRC for a given CQI according to conventional TFRC selection approaches for HSDPA, the TFRC parameters of TBSS, number of spreading codes, and modulation are mutually dependent. Therefore, multiple different TFRCs may be able to match the desired channel characteristics corresponding to a given CQI level, including maximum expected data rate and TB success probability.

TABLE 1

| CQI mapping table for UE category 10 according to 3GPP TS 125.214. | | | |
|---|---|---|---|
| CQI | TBSS | Number of spreading codes | Modulation |
| 0 | N/A | Out of range | |
| 1 | 137 | 1 | QPSK |
| 2 | 173 | 1 | QPSK |
| 3 | 233 | 1 | QPSK |
| 4 | 317 | 1 | QPSK |
| 5 | 377 | 1 | QPSK |
| 6 | 461 | 1 | QPSK |
| 7 | 650 | 1 | QPSK |
| 8 | 792 | 2 | QPSK |
| 9 | 931 | 2 | QPSK |
| 10 | 1262 | 2 | QPSK |
| 11 | 1483 | 3 | QPSK |
| 12 | 1742 | 3 | QPSK |
| 13 | 2279 | 3 | QPSK |
| 14 | 2583 | 4 | QPSK |
| 15 | 3319 | 4 | QPSK |
| 16 | 3565 | 5 | 16-QAM |
| 17 | 4189 | 5 | 16-QAM |
| 18 | 4664 | 5 | 16-QAM |
| 19 | 5287 | 5 | 16-QAM |
| 20 | 5887 | 5 | 16-QAM |
| 21 | 6554 | 5 | 16-QAM |
| 22 | 7168 | 5 | 16-QAM |
| 23 | 9719 | 7 | 16-QAM |
| 24 | 11418 | 8 | 16-QAM |
| 25 | 14411 | 10 | 16-QAM |
| 26 | 17237 | 12 | 16-QAM |
| 27 | 21754 | 15 | 16-QAM |
| 28 | 23370 | 15 | 16-QAM |
| 29 | 24222 | 15 | 16-QAM |
| 30 | 25558 | 15 | 16-QAM |

Conventional strategies for selecting a TFRC include choosing a fewer number of spreading codes N than the maximum number of available spreading codes M because the total allocated power Pt is divided among the N used spreading codes. Therefore it is believed that received signal quality is better when more power is allocated per spreading code.

The inventor has recognized, however, that higher power for each spreading code increases interference with the other spreading codes in the channel, and employing fewer spreading codes does not necessarily provide better performance results, particularly in receivers employing advanced decoding techniques. Existing TFRC selection procedures do not take into account the interference effects of simultaneous transmissions using different spreading codes or the capabilities of advanced receivers. Therefore, a procedure for TFRC selection that improves upon the existing techniques is desired.

SUMMARY

The present invention provides a method and apparatus for transport format resource combination (TFRC) selection in a medium access control (MAC) layer that enhances channel capacity. TFRC selection includes selection of transport block set size (TBSS), number of spreading codes, and modulation type for data transmission. The maximum number of spreading codes available for transmission and the set of possible TFRCs are determined based on channel characteristics of the downlink channel provided by the physical (PHY) layer. For each TBSS value in the set of possible TFRCs, a TFRC is selected with the largest number of spreading codes within the maximum number of spreading codes for which the corresponding coding rate is preferably at least $1/3$. The corresponding code rates for the selected TFRCs are compared to thresholds to select a type of modulation. Finally, one of the selected TFRCs is selected to be provided to the PHY layer that best matches downlink channel quality and preferably with the largest TBSS in order to maximize the throughput. The present invention is preferably used in Universal Mobile Telecommunications Systems (UMTS) high speed downlink packet access (HSDPA) communication systems, or in a wireless communication system employing code division multiple access (CDMA).

Other objects and advantages will be apparent to those of ordinary skill in the art based upon the following description of presently preferred embodiments of the invention.

DETAILED DESCRIPTION OF THE PREFERRED EMBODIMENTS

As used herein, a wireless transmit/receive unit (WTRU) includes but is not limited to a user equipment, mobile station, fixed or mobile subscriber unit, pager, cellular telephone, personal digital assistant (PDA), computer, or any other type of device capable of operating in a wireless environment. A base station is a type of WTRU generally designed to provide network services to multiple WTRUs and includes, but is not limited to, a Node B, site controller, access point or any other type of interfacing device in a wireless environment.

Figure 1:
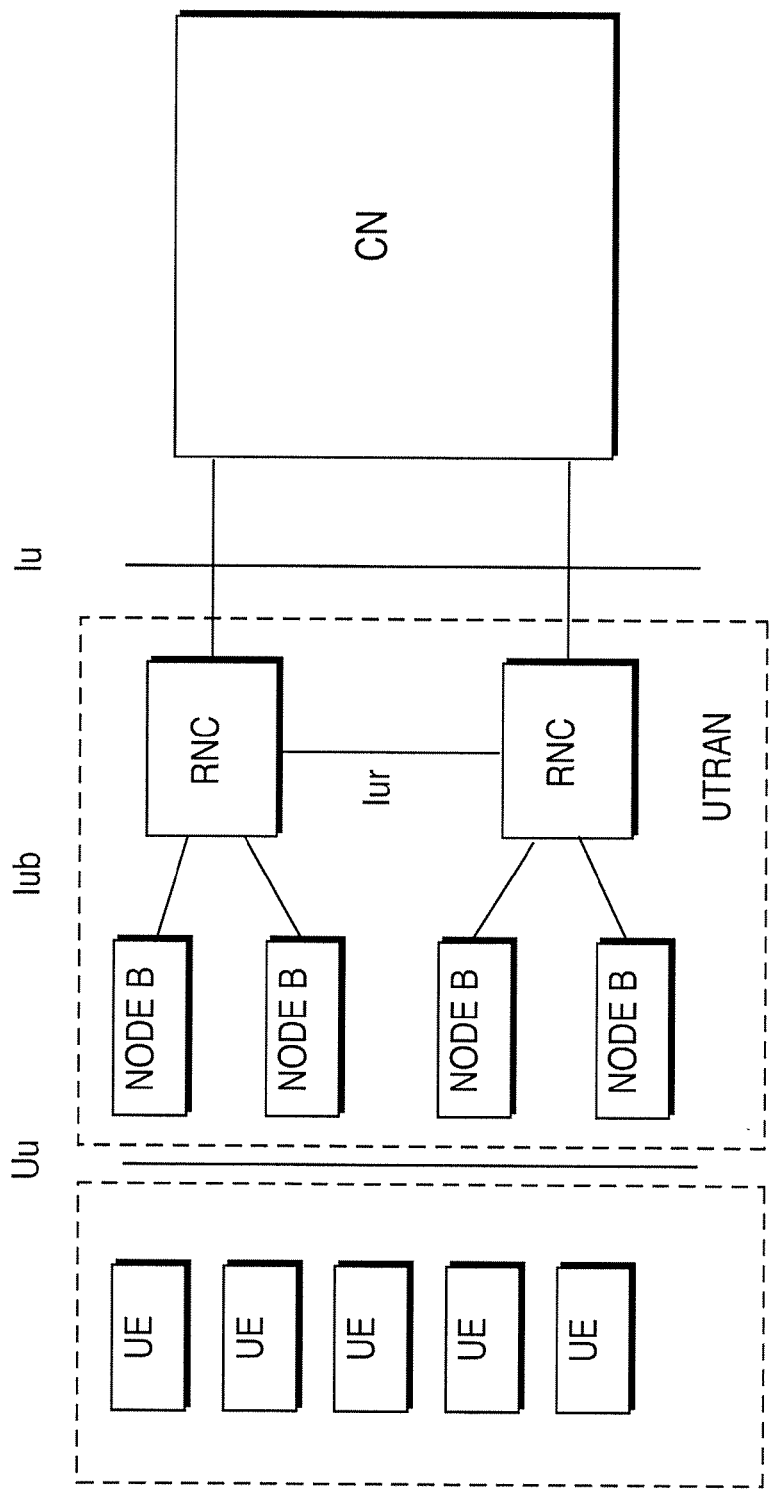
FIG. 1 shows an overview of the system architecture of a conventional Universal Mobile Telecommunications Systems (UMTS) network.
Figure 2:
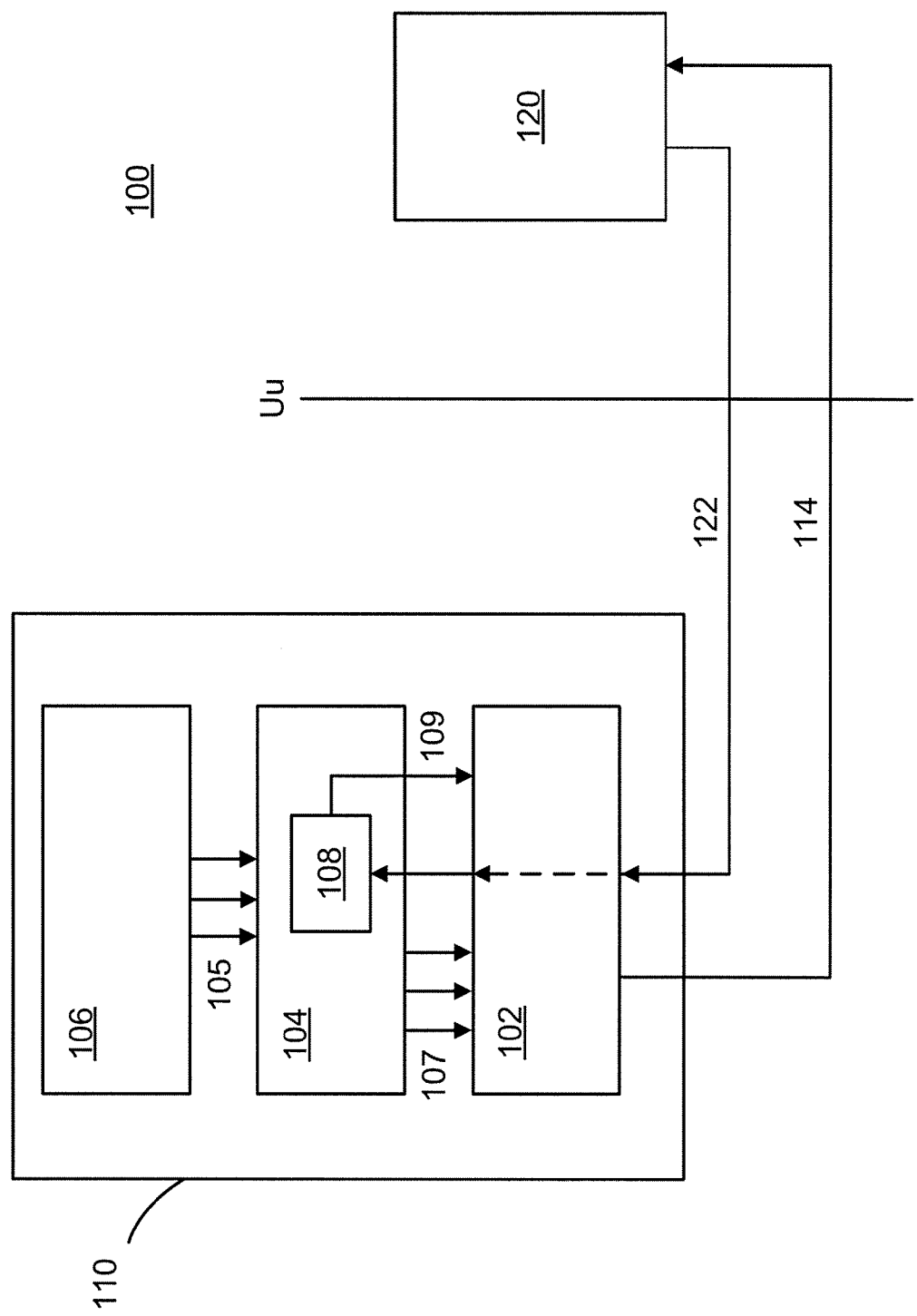
FIG. 2 is a block diagram of an example communication system 100 in which a base station 110 is communicating with a WTRU 120 in accordance with the present invention.

FIG. 2 is a block diagram of a communication system 100 in which a base station 110 is communicating with a WTRU 120 over a Uu air interface according to the current HSDPA standard and the present embodiments. For illustrative purposes, protocol layers are shown in the base station 110 including physical layer (PHY) components 102, medium access control (MAC) layer components 104, and higher layer components 106 which include a radio link control (RLC) layer. Adjacent layers in the protocol stack communicate with each other. The MAC layer components 104 are responsible for mapping data streams 105 (also called logical channels) from the higher layer components 106 to transport channels 107 provided to the PHY layer 102 for physical transmission over the wireless channel. [0031B] The MAC layer also selects the transport format (TF) and link adaptation parameters for data transmission including transport block set size (TBSS), number of spreading codes, and modulation type that are collectively referred to as transport format resource combination (TFRC). As described in accordance with the present invention below, selection of TFRC is preferably performed in the MAC layer by a TFRC selection function component 108 prior to each TTI. The selected TFRC parameters 109 are provided to the PHY layer 102 so that they may be used in the physical transmission of data 114 to the WTRU 120 in a common TTI by way of TBs.

TFRC selection is based at least in part on characteristics of the physical channel and is not fixed for a given data packet size. Information regarding the physical channel is provided by WTRU 120. WTRU 120 takes channel quality measurements, such as determining the maximum expected data rate, of the downlink channel and transmits a corresponding channel quality indicator (CQI) 122 to the base station 110.

The CQI is typically represented as an integer value from 1 to 30, where each CQI value has a predetermined mapping to a TFRC including a TBSS, a corresponding number of spreading codes and a corresponding type of modulation that is known at WTRU 120 and base station 110. This mapping also depends on the physical capabilities of WTRU 120, and a WTRU is typically assigned to a physical layer category based on its receiver capabilities such as the maximum supported number of received bits per TTI and the maximum supported number of spreading codes per TTI. 3GPP Technical Standard (TS) 125.214 provides CQI mapping tables for different WTRU physical layer categories (referred to as UE categories) and UE categories are described in 3GPP TS 125.306. For illustration purposes, an example CQI mapping for UE category 10 is given in Table 1.

The WTRU selects the CQI value for which the TFRC mapping is determined to most closely match the maximum expected data rate on the downlink channel while satisfying a minimum desired TB success probability, which refers to the desired success rate of decoding received TBs at WTRU 120. The same TB success probability is typically known at WTRU 120 and base station 110, and is preferably equal to 0.9 according to existing HSDPA standards. To compare a TFRC to the maximum expected data rate of the downlink channel, a corresponding expected data rate for the TFRCs in the mapping table can be determined in advance, for example via simulation.

The CQI value 122 reported by WTRU 120 to base station 110 is provided to the MAC layer 104 via the PHY layer 102, and the TFRC selection function 108 selects a TFRC 109 that best achieves the maximum expected data rate of the channel as determined by the CQI value and its mapping.

The present invention provides an information theoretic approach to selecting a more optimal transport format resource combination (TFRC) in a wireless communication system, where TFRC includes transport block set size (TBSS), number of spreading codes, and modulation type for data transmission over a wireless code division multiple access (CDMA) channel on a common transmission time interval (TTI) boundary. Although the present invention is described herein with reference to high speed downlink packet access (HSDPA) for downlink communications in UMTS systems, the disclosed TFRC selection procedure has broader applicability and is applicable to general CDMA wireless communication systems including Third Generation Partnership Project (3GPP) CDMA2000 and high speed packet access evolution (HSPA+) systems. The present invention may be used in both uplink (UL) and downlink (DL) communications, and therefore may be readily be implemented in WTRUs configured as user equipments (UEs) or base stations, such as Node Bs.

Preferably, an optimum number of spreading codes N is selected for TFRC according to the number of spreading codes that maximize the information theoretic channel capacity. To derive this capacity, the communication channel can be assumed to be an additive white Gaussian noise (AWGN) channel with bandwidth B such that the power Pt of the transmitter is fixed. Data is transmitted over bandwidth B using N different orthogonal spreading codes such that N is less than or equal to the maximum number of available spreading codes M. In HSDPA, the maximum number of available spreading codes M is at most 15.

A signal transmitted over the communication channel using N orthogonal spreading codes can be modeled by N separate corresponding propagation channels, each with bandwidth B/M. Because the spreading codes are orthogonal, the noise on each of the propagation channels after the despreading of the signal is uncorrelated and has equal power. If A represents the total signal-to-noise ratio (SNR) of the communication channel, the SNR of each individual propagation channel is proportional to A/N because the total allocated power Pt is shared equally over the N spreading codes. Adaptive modulation and coding (AMC) can be applied individually to each propagation channel along with advanced receiver and coding techniques to achieve a channel capacity close to the theoretical upper limit of $B/M*\log(1+A/N)$ (known as Shannon's capacity formula). It then follows that the capacities of each of the propagation channels $C_1, \ldots, C_N$ are the same and proportional to $(1/M)*\log(1+A/N)$. According to this result, propagation channel capacities $C_1, \ldots, C_N$ slowly decrease as N increases. The total capacity C, however, is proportional to $N*(1/M)*\log(1+A/N)$, which is an increasing function of N in all practical cases. Therefore, in accordance with the present invention, the number of spreading codes N is preferably maximized in order to maximize the total capacity of the channel. This is different from typical HSDPA TFRC selection approaches that do not attempt to maximize the number of spreading codes N used for communication with a particular WTRU.

The number of spreading codes N is limited by the total number of available spreading codes M such that $N \leq M$. In accordance with a preferred embodiment of the present invention, the number of spreading codes N may also be limited by the code rate used for error correction on the physical channel. Coding techniques, such as convolutional codes and turbo codes, are used to add redundancy to transmitted information to correct bit errors that occur in the channel and at the receiver, and the code rate (also called coding rate) is the fraction of non-redundant data bits in a transmitted packet. For example, if for each data bit, one redundant bit is added by the encoder, the resulting code rate is ½. According to HSDPA, all error correcting codes are derived from a rate ⅓ turbo code, although the actual coding rate may be adjusted based on the channel quality indicator (CQI) information using puncturing or repetition techniques that involve deleting or adding bits, respectively, at the encoder output. The selection of coding rate and modulation based on channel quality information is referred to as adaptive modulation and coding (AMC).

If, as a result of AMC, the code rate is less than ⅓, then the effective coding gain is reduced because bit repetition, which is known to be a weak coding scheme, is required to fill the coded transport block (TB). Therefore, in accordance with a preferred embodiment of the present invention, the number of spreading codes N is preferably selected to be as large as possible while maintaining a ⅓ or greater channel coding rate and without exceeding the total number of available spreading codes M. The unused spreading codes may preferably be used by other WTRUs communicating over the same channel to make full use of the physical resources. Alternatively, a greater number of spreading codes may be used with a corresponding code rate less than ⅓ and with a lower coding gain, however, this results in fewer spreading codes being available for use by other WTRUs.

Referring back to the theoretical channel capacity model above, each of the N propagation channels may experience multipath fading and inter-code interference that is present at the output of a despreader in the receiver. By modeling the inter-code interference as additive noise, the inter-code interference has the effect of decreasing the received SNR at the despreader output. The multipath experienced on each of the N propagation channels is identical (because the propagation channels are spread over the same bandwidth), the equalizer used to receive each propagation channel is identical and the power transmitted on each propagation channel is identical. Thus, the effective noise increase as a result of inter-code interference is the same in each propagation channel and proportional to $(N-1)/N$, such that the actual value of the proportionality constant depends on the effectiveness of the equalizer in restoring the orthogonality of the spreading codes.

This proportionality constant is commonly referred to as the non-orthogonality factor (NOF), and can range from 0.0 to 1.0 but is typically much less than 1.0 in advanced receivers. The overall noise power in the channel resulting from inter-code interference is equal to $NOF \cdot S(N-1)$, where S is the received signal power on a propagation channel. The resulting overall channel capacity is given by $$C = \frac{N}{M} \log_2\left(1 + \frac{S}{N \cdot I + NOF \cdot S(N-1)}\right).\qquad\text{Equation (1)}$$

where I is the total interference on the received signal.

The capacity in Equation 1 is not necessarily monotone increasing depending on the values of S, I, and NOF. Nonetheless, for practical scenarios Equation 1 is maximized by maximizing the number of codes N because the slowly decreasing logarithmic function of N is outweighed by the linearly increasing factor of N outside of the logarithmic function. In scenarios where the values of S, I, and NOF are such that the logarithmic function of N dominates the outside factor of N, choosing N=1 maximizes the channel capacity. However, the latter scenario is likely only to occur under very poor channel conditions in which a WTRU may have already handed-off to another base station.

Based on the above, and in accordance with a preferred embodiment of the present invention, the number spreading codes N selected as part of TFRC selection is preferably maximized, as permitted by the coding rate and the total number of available codes M, except under very poor channel conditions in which case only one spreading code N=1 is preferably used.

Also in accordance with the present invention, the modulation type associated with a TFRC is preferably selected to maximize channel capacity. In the case of 3GPP systems and in particular HSDPA, the available modulation types are limited to, for example, quadrature phase shift keying (QPSK) modulation, 16 quadrature amplitude modulation (16-QAM) and possibly higher order modulation such as 64 quadrature amplitude modulation (64-QAM). In accordance with a preferred embodiment of the present invention, a threshold test on the code rate is preferably used to select a type of modulation from among the available modulation types to maximize the channel throughput, as described further below.

Figure 3:
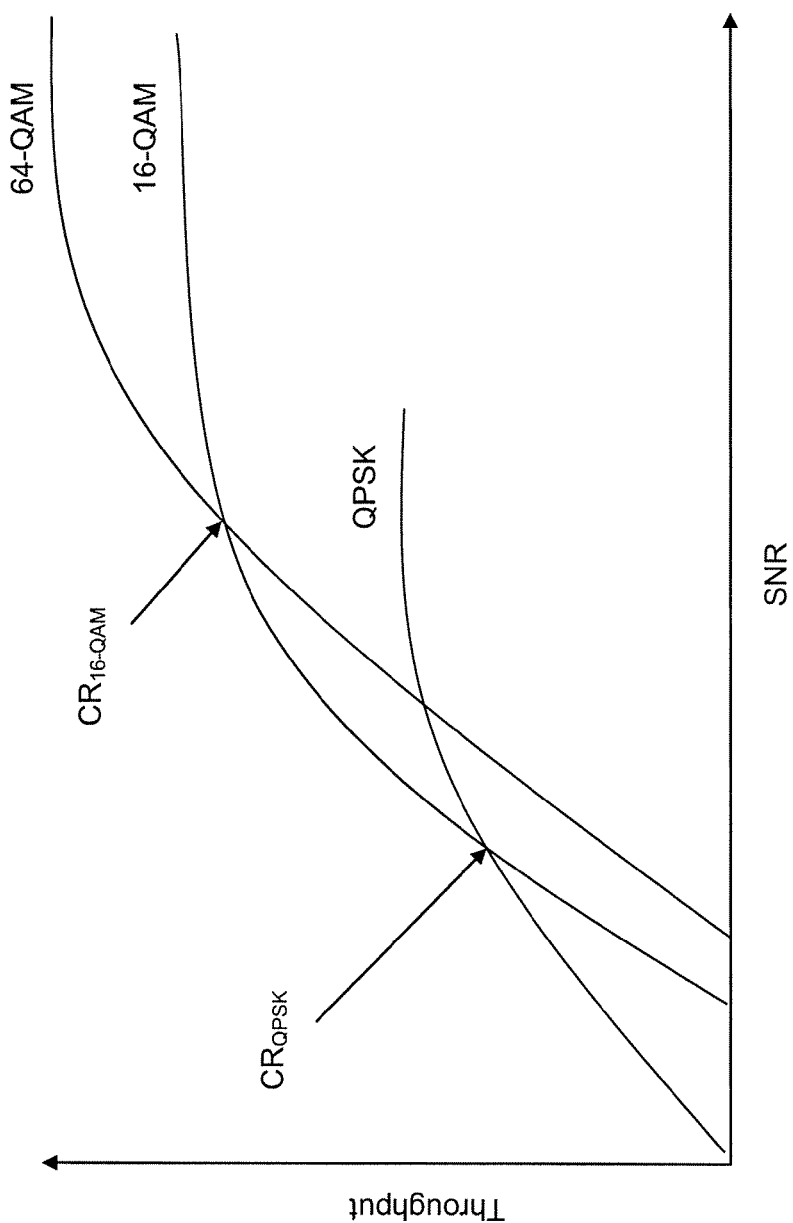
FIG. 3 illustrates a graph of measured channel throughput versus signal-to-noise ratio (SNR) at a receiver for various modulation techniques, which may be used to select a preferred type of modulation for a transport format resource combination (TFRC) in accordance with the present invention.

For any particular type of modulation, the code rate must be proportionally increased with the desired signal-to-noise ratio (SNR) at the receiver to maintain a channel throughput as close as possible to the maximum throughput. Therefore, the code rate threshold values are preferably determined by comparing the measured throughput for a desired SNR for each of the available modulation techniques, and a modulation scheme is selected that achieves the highest throughput for its associated coding rate. By way of example, consider an HSDPA downlink channel that supports QPSK, 16-QAM and 64-QAM modulations. FIG. 3 illustrates an example of the empirically measured channel throughput for different SNR values at the receiver for each of the available modulation techniques. The code rate $CR_{QPSK}$ where the QPSK and 16-QAM throughput curves cross, and code rate $CR_{16\text{-}QAM}$ where the 16-QAM and 64-QAM throughput curves cross are determined and used as the code rate threshold values. Given a TFRC, for each type of available modulation a corresponding code rate is determined according to the reported CQI information. If the corresponding code rate for QPSK is below the $CR_{QPSK}$ threshold, then QPSK modulation is selected because it achieves the highest throughput for that coding rate compared to 16-QAM and 64-QAM as shown in FIG. 3. If the code rate associated with QPSK modulation is greater than the threshold $CR_{QPSK}$, and the code rate associated with 16-QAM modulation is less than $CR_{16\text{-}QAM}$, then 16-QAM is selected to maximize throughput. If the code rate for 16-QAM is greater than $CR_{16\text{-}QAM}$, then 64-QAM is selected to maximize throughput. An example of a possible code rate threshold for QPSK is $CR_{QPSK} \approx 0.74$, which is greater than ⅓. Although choosing a modulation type for TFRC selection has been described for QPSK, 16-QAM and 64-QAM, the present invention may be extended to select a modulation type from among any number of modulation techniques, including, but not limited to, additional higher order modulations, or between QPSK and 16-QAM only when 64-QAM is not available.

Figure 4A:
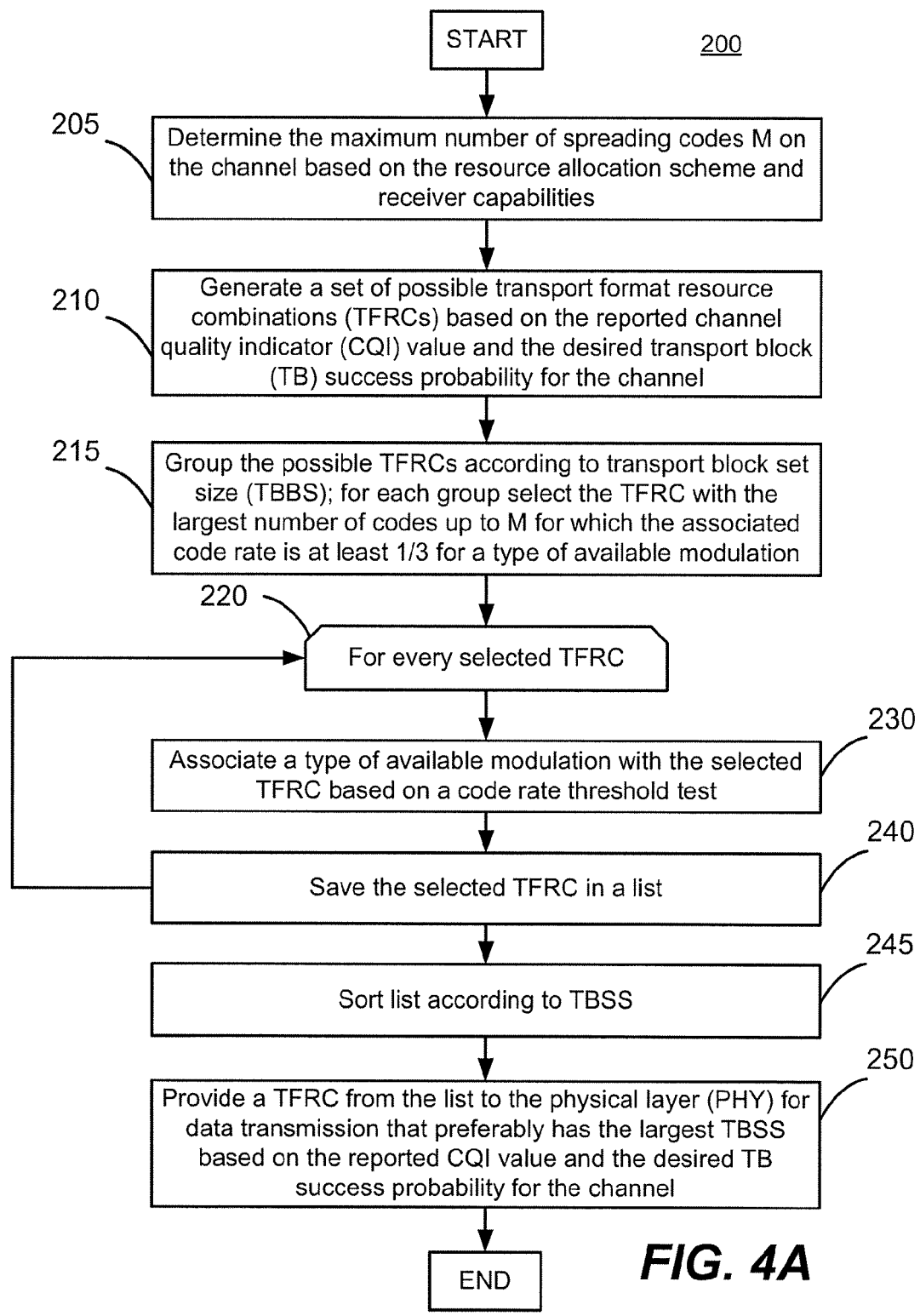
FIG. 4A is a flow diagram of a method for generating and selecting TFRCs in accordance with the present invention.
Figure 4B:
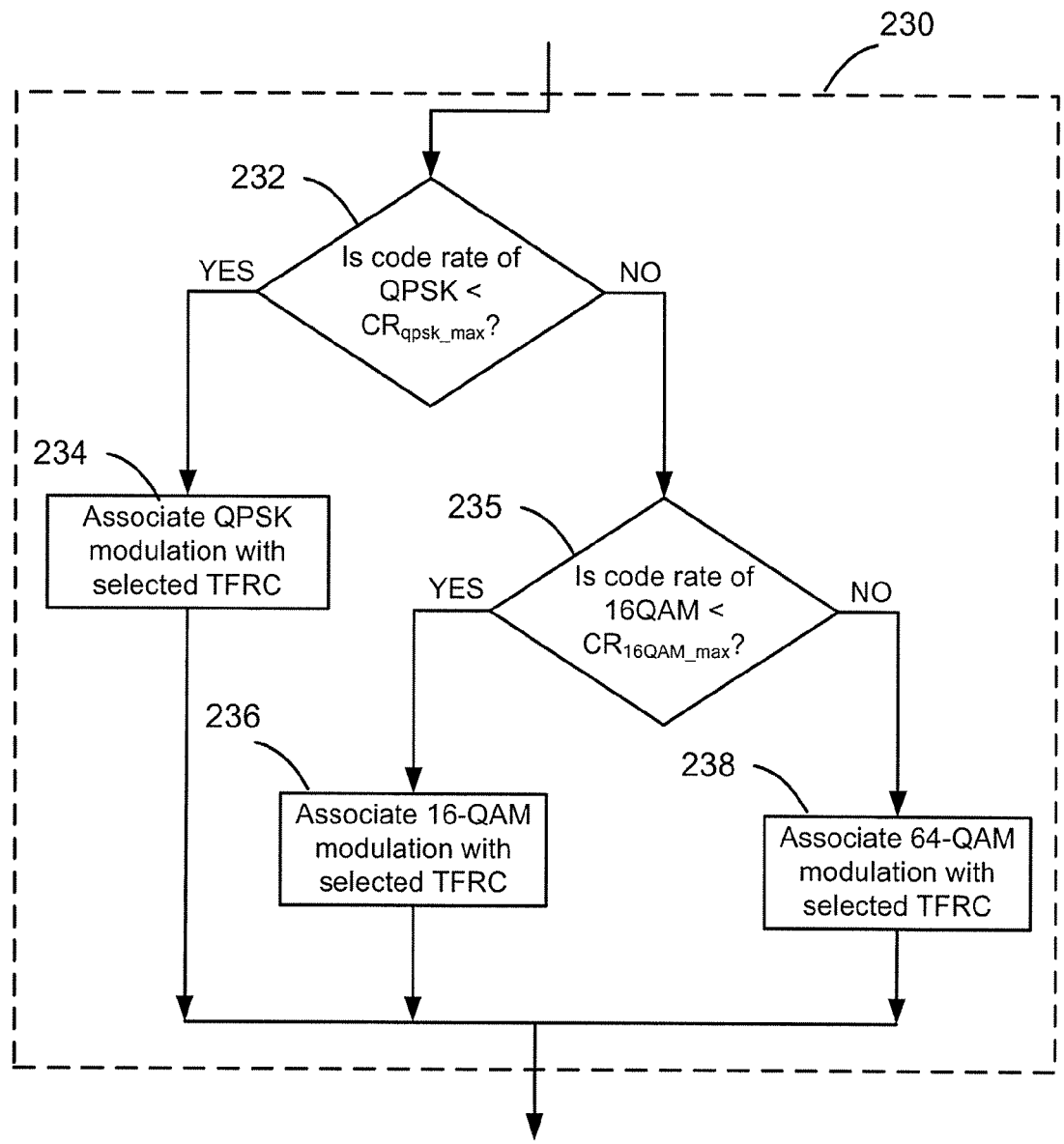
FIG. 4B is a flow diagram of a method for selecting a type of modulation from among quadrature phase shift keying (QPSK), 16 quadrature amplitude modulation (16-QAM) and 64 quadrature amplitude modulation (64-QAM) to be associated with a TFRC in accordance with the present invention.

FIGS. 4A and 4B illustrate the steps of a preferred method 200 for generating and selecting TFRCs in accordance with the present invention that includes the various embodiments discussed above for selecting a number of spreading codes and modulation type. The TFRC selection presented in FIGS. 4A and 4B is preferably performed by a TFRC selection function component 108 in FIG. 2 prior to a TTI.

Referring to FIG. 4A, in step 205 the maximum number of spreading codes M available for use on the physical channel is determined based on the resource allocation scheme and the receiver capabilities of the receiving WTRU. Recall that for HSDPA, the transmitting base station may use up to 15 spreading codes, and the number of spreading codes supported by the receiving WTRU is given by its UE physical layer category. In step 210, a set of possible TFRCs are generated that match the channel characteristics implied by the reported CQI value and that meet a minimum desired TB success probability. The channel characteristics are preferably a maximum expected data rate for the downlink channel, which may be known at the base station for a given CQI level or explicitly provided by the WTRU. Generating a possible TFRC includes generating a transport block set size (TBSS), a number of spreading codes and a modulation type which, when applied to a transmitted TB, have an expected data rate close to the maximum expected data rate of the downlink channel and meet the desired TB success probability following decoding at the receiving WTRU. The expected data rate for a given TFRC may be determined, for example, by simulation. As discussed above, the desired TB success probability for the downlink channel is preferably a predetermined value that is known to both the transmitting base station and the receiving WTRU.

In step 215, the set of possible TFRCs are grouped according to common TBSS. In each group a TFRC is preferably selected that has a largest number of spreading codes, up to the determined maximum number of spreading codes M, for which the associated code rate is at least ⅓ for at least one type of available modulation scheme. Types of modulation may include QPSK modulation, 16-QAM modulation and any other higher order modulations. The TFRCs that are not selected are preferably discarded.

For every selected TFRC, beginning at step 220, a modulation type is associated with the selected TFRC based on a code rate threshold test in step 230. Determining code rate threshold values is described above with respect to FIG. 3. FIG. 4B gives a particular example of a code rate threshold test for selecting a modulation type when QPSK, 16-QAM and 64-QAM modulations are available. The code rate associated with QPSK modulation is compared to a predetermined threshold in step 232. If that code rate is below $CR_{QPSK}$, QPSK modulation is associated with the selected TFRC in step 233. If the code rate is above $CR_{QPSK}$, then the code rate associated with 16-QAM modulation is compared to threshold $CR_{16\text{-}QAM}$ in step 235. If that code rate is below $CR_{16\text{-}QAM}$, then 16-QAM is associated with the selected TFRC in step 236. Otherwise, 64-QAM is associated with the selected TFRC in step 238. Referring to FIG. 4A, each selected TFRC is thereafter preferably saved in a list in step 240.

When the listing of the selected TFRCs is completed, the list of selected TFRCs is preferably sorted in order of TBSS in step 245. The list represents all of the possible TFRCs for use when sending data to the WTRU in accordance with the present invention. In step 250, one TFRC from among the list of selected TFRCs is provided to the PHY layer for data transmission that preferably has the largest TBSS while maintaining the desired TB success probability for the channel characteristics defined by the reported CQI value.

In accordance with a preferred embodiment of the present invention as described with respect to FIGS. 4A and 4B, a new mapping of CQI values to preferred TFRCs can be created, an example of which is illustrated in Table 2 for a HSDPA downlink channel that supports a maximum number of 15 spreading codes, QPSK and 16-QAM modulation and a TB success probability of 0.9. A CQI of 0 is used when the receiving WTRU is out of range to receive signals on the downlink channel.

TABLE 2

CQI mapping for TFRC selection according to the present invention for a HSDPA downlink channel with a category 10 UE supporting a maximum of 15 spreading codes and QPSK or 16-QAM modulation

| CQI | Code rate | TBSS | Number of spreading codes | Modulation |
| --- | --- | --- | --- | --- |
| 0 | N/A | N/A | Out of range | |
| 1 | 0.14271 | 137 | 1 | QPSK |
| 2 | 0.18021 | 173 | 1 | QPSK |
| 3 | 0.21771 | 209 | 1 | QPSK |
| 4 | 0.26771 | 257 | 1 | QPSK |
| 5 | 0.33021 | 317 | 1 | QPSK |
| 6 | 0.40521 | 389 | 1 | QPSK |
| 7 | 0.56771 | 545 | 1 | QPSK |
| 8 | 0.39115 | 751 | 2 | QPSK |
| 9 | 0.35972 | 1036 | 3 | QPSK |
| 10 | 0.35313 | 1356 | 4 | QPSK |
| 11 | 0.3191 | 1838 | 6 | QPSK |
| 12 | 0.35149 | 2362 | 7 | QPSK |
| 13 | 0.34502 | 2981 | 9 | QPSK |
| 14 | 0.32656 | 3762 | 12 | QPSK |
| 15 | 0.32389 | 4664 | 15 | QPSK |
| 16 | 0.38056 | 5480 | 15 | QPSK |
| 17 | 0.45514 | 6554 | 15 | QPSK |
| 18 | 0.52528 | 7564 | 15 | QPSK |
| 19 | 0.59542 | 8574 | 15 | QPSK |
| 20 | 0.67493 | 9719 | 15 | QPSK |
| 21 | 0.75146 | 10821 | 15 | QPSK |
| 22 | 0.43361 | 12488 | 15 | 16-QAM |
| 23 | 0.48278 | 13904 | 15 | 16-QAM |
| 24 | 0.53753 | 15481 | 15 | 16-QAM |
| 25 | 0.58788 | 16931 | 15 | 16-QAM |
| 26 | 0.62031 | 17865 | 15 | 16-QAM |
| 27 | 0.66639 | 19192 | 15 | 16-QAM |
| 28 | 0.70316 | 20251 | 15 | 16-QAM |
| 29 | 0.76899 | 22147 | 15 | 16-QAM |
| 30 | 0.88743 | 25558 | 15 | 16-QAM |

Table 2 includes the preferred TBSS, number of spreading codes and modulation type as derived according to the present invention described above, and the associated coding rate, for each possible CQI value for a category 10 WTRU. When Table 2 is compared to the CQI mapping table for a category 10 UE in 3GPP TS 125.214 as reproduced in Table 1, it is observed that TFRC selection according to the present invention generally selects a greater number of spreading codes and a larger TBSS, whenever possible and in particular for intermediate CQI values, in order to improve overall channel throughput.

Figure 5:
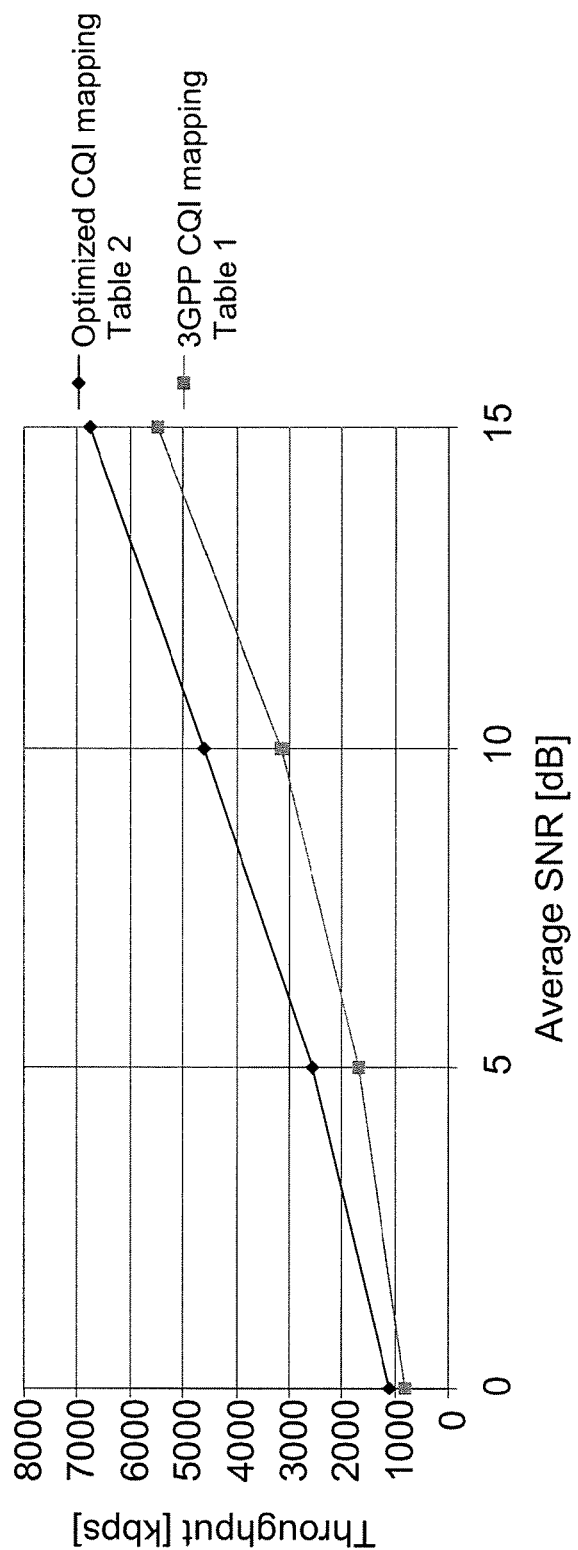
FIG. 5 shows the measured throughput on a downlink CDMA channel using the existing 3GPP CQI mapping as given in Table 1 compared to the measured throughput for the optimized CQI mapping generated according to the present invention in Table 2 for a category 10 UE for a range of average SNR values and for a TB success probability of 0.9.

FIG. 5 shows the measured throughput on a downlink CDMA channel using the existing 3GPP CQI mapping as given in Table 1 compared to the measured throughput for the optimized CQI mapping generated according to the present invention in Table 2 for a category 10 UE for a range of average SNR values and for a TB success probability of 0.9. The throughput is given versus an average SNR because of variations in the instantaneous SNR as a result of fading in the channel. FIG. 5 illustrates the improvement in throughput achieved by the present invention over existing TFRC selection techniques.

Although the features and elements of the present invention are described in the preferred embodiments in particular combinations, each feature or element can be used alone without the other features and elements of the preferred embodiments or in various combinations with or without other features and elements of the present invention. The methods or flow charts provided in the present invention may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

The components for implementing the invention referenced above may be implemented as separate physical devices or combined such as in a processor that implements the functions of multiple components. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any integrated circuit, and/or a state machine.

A processor in association with software may be used to implement a radio frequency transceiver for in use in a wireless transmit receive unit (WTRU), user equipment, terminal, base station, radio network controller, or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A method for use in wireless communication, the method comprising:
   selecting a transport format resource combination (TFRC), wherein, as part of the TFRC selection, a number of spreading codes is selected subject to a limitation by a code rate used for error correction; and
   transmitting a message in accordance with the selected TFRC, wherein the TFRC is selected by:
   generating a plurality of TFRCs based on a reported channel quality indicator (CQI) value and a minimum transport block (TB) success probability;
   grouping the generated TFRCs based on a transport block set size (TBSS) associated with each generated TFRC;

determining a TFRC for each group based on a number of spreading codes associated with each TFRC in the group that have an acceptable associated code rate for a modulation type;

associating a modulation type with each determined TFRC based on a code rate threshold test; and selecting a TFRC from the determined TFRCs based on the TBSS associated with each TFRC, the reported CQI value, and the minimum TB success probability.

2. The method of claim 1, wherein the selected TFRC includes:
a transport block set size (TBSS);
the number of spreading codes; and
a modulation type.

3. The method of claim 1, wherein the transmitting includes signaling over a wireless code division multiple access (CDMA) channel on a common transmission time interval (TTI) boundary.

4. The method of claim 1, wherein a maximum number of spreading codes is selected within an allowable limit.

5. The method of claim 1, wherein the number of spreading codes is selected to maximize an information theoretic channel capacity.

6. The method of claim 5, further comprising:
deriving the information theoretic channel capacity.

7. The method of claim 6, further comprising:
receiving a message over a bandwidth using a plurality of orthogonal spreading codes; and
applying adaptive modulation and coding (AMC) to a plurality of propagation channels where each propagation channel in the plurality of propagation channels corresponds to a spreading code in the plurality of orthogonal spreading codes.

8. The method of claim 1, wherein on a condition that channel conditions are very poor, the number of spreading codes is selected to 1.

9. The method of claim 1, wherein a modulation type is selected to maximize channel capacity.

10. The method of claim 9, wherein the modulation type is selected by performing threshold testing.

11. The method of claim 10, wherein the threshold testing includes determining a modulation type that has a maximum throughput measurement at a code rate by comparing a plurality of throughput measurements for a desired signal to noise ratio (SNR) where each throughput measurement is associated with a modulation type in a plurality of available modulation types.

12. A wireless transmit/receive unit (WTRU) comprising:
a processor configured to select a transport format resource combination (TFRC), wherein the processor is configured to select, as part of the TFRC selection, a number of spreading codes subject to a limitation by a code rate used for error correction; and
a transmitter configured to transmit a message in accordance with the selected TFRC,
wherein the processor is configured to generate a plurality of TFRCs based on a reported channel quality indicator (CQI) value and a minimum transport block (TB) success probability, group the generated TFRCs based on a transport block set size (TBSS) associated with each generated TFRC, determine a TFRC for each group based on a number of spreading codes associated with each TFRC in the group that have an acceptable associated code rate for a modulation type, associate a modulation type with each determined TFRC based on a code rate threshold test, and select a TFRC from the determined TFRCs based on the TBSS associated with each TFRC, the reported CQI value, and the minimum TB success probability.

13. The WTRU of claim 12, wherein the processor is configured to select the number of spreading codes that maximizes an information theoretic channel capacity, and wherein the processor is configured to select the TFRC based on the identified number of spreading codes.

14. The WTRU of claim 13, wherein the processor is configured to derive the information theoretic channel capacity.

15. The WTRU of claim 14, further comprising:
a receiver configured to receive a message over a bandwidth using a plurality of orthogonal spreading codes, wherein the processor is configured to derive an information theoretic channel capacity by applying adaptive modulation and coding (AMC) to a plurality of propagation channels where each propagation channel in the plurality of propagation channels corresponds to a spreading code in the plurality of orthogonal spreading codes.

* * * * *